United States Patent [19]
Rothblatt

[11] Patent Number: 6,105,060
[45] Date of Patent: Aug. 15, 2000

[54] SYSTEM FOR PROVIDING GLOBAL PORTABLE INTERNET ACCESS USING LOW EARTH ORBIT SATELLITE AND SATELLITE DIRECT RADIO BROADCAST SYSTEM

[75] Inventor: Martine A. Rothblatt, Silver Spring, Md.

[73] Assignee: WorldSpace, Inc., Washington, D.C.

[21] Appl. No.: 08/923,935

[22] Filed: Sep. 5, 1997

[51] Int. Cl.$^7$ ............................... H04N 7/14; H04N 1/02
[52] U.S. Cl. ............................. 709/219; 348/10; 348/12; 455/5.1; 455/6.2
[58] Field of Search ................................. 709/217–219; 455/3.1, 3.2, 5.1, 6.1, 6.2, 6.3, 4.1, 4.2; 349/6, 10, 12, 13

[56] References Cited

U.S. PATENT DOCUMENTS

| | | | |
|---|---|---|---|
| H1641 | 4/1997 | Sharman | 379/60 |
| 4,720,873 | 1/1988 | Goodman et al. | 455/2 |
| 5,019,910 | 5/1991 | Filmer | 358/188 |
| 5,095,480 | 3/1992 | Fenner | 370/94.1 |
| 5,159,592 | 10/1992 | Perkins | 370/85.7 |
| 5,303,393 | 4/1994 | Noreen et al. | |
| 5,410,543 | 4/1995 | Seitz et al. | 370/85.13 |
| 5,442,633 | 8/1995 | Perkins et al. | 370/94.3 |
| 5,455,823 | 10/1995 | Noreen et al. | 370/50 |
| 5,490,258 | 2/1996 | Fenner | 395/401 |
| 5,570,084 | 10/1996 | Ritter et al. | 340/825.05 |
| 5,579,367 | 11/1996 | Raymond et al. | 455/3.2 X |
| 5,586,232 | 12/1996 | Moura et al. | 370/404 |
| 5,604,803 | 2/1997 | Aziz | 380/25 |
| 5,606,668 | 2/1997 | Shwed | 395/200.11 |
| 5,625,640 | 4/1997 | Palmer et al. | 375/202 |
| 5,633,933 | 5/1997 | Aziz | 380/30 |
| 5,689,245 | 11/1997 | Noreen et al. | |
| 5,699,384 | 12/1997 | Dillon | 375/316 |
| 5,835,487 | 11/1998 | Campanella | 455/3.2 X |

FOREIGN PATENT DOCUMENTS 9732251  9/1997  WIPO .

OTHER PUBLICATIONS

"MediaStream by MEDIA4", Media4, Inc.
"Satellite Express™: A Brilliant Way to Receive Information & Entertainment", Adaptec, Inc., 1997.
E–Star™, Intelligent Devices, Inc.

Echonet Internet/Intranet Broadcasting Software product description, International Datacasting.

NetManager Network Control Software, International Datacasting.

SuperFlex Digital Broadcast System, International Datacasting.

"Telsat Turbo: Direct Data or Video Broadcasting to PC", SAT, Networks and Telecommunications Division.

"DigitalXpress: Your Business Satellite Network", DigitalXpress, 1997.

F.C.C. Application of Sky Station International, Inc. for Authority to Construct, Deploy and Operate a Global Stratospheric Telecommunications System, Mar. 20, 1996.

Liebowitz, Burt H., "Worldwide Connections—Expanding the Internet Using Geosynchronous Satellites", Satellite Communications, Sep., 1997.

Pekins, Charles E., Mobile IP, *IEEE Communications*, May 1997, pp. 84–99.

*Primary Examiner*—John W. Miller
*Attorney, Agent, or Firm*—Royland, Abrams, Berdo & Goodman

[57] ABSTRACT

A system for providing global and portable Internet access to low cost user terminals comprises an Internet service provider gateway and a broadcast station for providing multimedia information from the gateway to the user terminals via a direct radio broadcast geostationary satellite. User terminals each comprise a direct radio broadcast receiver and a transceiver for communicating with a low earth orbit (LEO) satellite. User terminals transmit Internet access requests, menu selections and other backhaul signals to the gateway via the transceiver. The broadcast station transmits information requested by the user from the gateway to a specific user terminal by providing identification codes in the broadcast programs. The user terminals are programmable to receive all broadcast programs but to demodulate and demultiplex only those broadcast channels addressed to the user terminal. Internet access is available simultaneously with reception of satellite direct broadcasts of audio programs.

20 Claims, 7 Drawing Sheets

6,105,060

SYSTEM FOR PROVIDING GLOBAL PORTABLE INTERNET ACCESS USING LOW EARTH ORBIT SATELLITE AND SATELLITE DIRECT RADIO BROADCAST SYSTEM

FIELD OF THE INVENTION

The present invention relates generally to a system and method for providing remote user terminals with global portable Internet access using a satellite direct radio broadcast system in combination with another communication system.

BACKGROUND OF THE INVENTION

Due to the expanding, worldwide use of personal computing devices, telecommunications devices and the Internet, the global economy is currently undergoing an information revolution that is expected to be as significant as the industrial revolution of the nineteenth century. A significantly large population of people, however, are generally underserved and dissatisfied with their telecommunications options and are therefore presently limited in their ability to participate in this information revolution. This population of people is primarily located in Africa, Central America, South America and Asia, where communication services have, to date, been characterized by the poor sound quality of short-wave radio broadcasts, or the coverage limitations of amplitude modulation (AM) band and frequency modulation (FM) band terrestrial radio broadcast systems.

A satellite-based direct radio broadcast system to transmit audio and data signals, including images, to low-cost consumer receivers in essentially any part of the world has been proposed. The satellite-based direct radio broadcast system provides a number of advantages over existing satellite systems, such as the ability to provide portable services. Many existing satellite systems fail to provide portable services because they require large satellite antennas to access such systems.

Low earth orbit (LEO) satellite systems are currently used to serve mobile and portable users. In addition, a number of geostationary satellite systems can provide portable or mobile communication services. However, existing LEO and geostationary satellite systems do not provide adequate channel capacity to provide the high outbound data rates required for transmission of information from the Internet and the World Wide Web (WWW) to many different users.

Systems have been proposed to use satellites to provide worldwide Internet/WWW access capability to fixed-site users. For example, systems which use geostationary satellites and multiple spot beams (e.g., Hughes Spaceway and Loral Cyberstar) have been proposed, as well as systems comprising hundreds of satellites in a geodesic dome-like arrangement around Earth or in multiple orbits (e.g., Teledesic). These systems, however, fail to provide global, portable Internet/WWW access capability.

A satellite-based direct radio broadcast system, however, is limited in that the receivers are one-way and do not permit a user to transmit voice or other information. Users of these receivers, therefore, cannot communicate bi-directionally via the satellite-based direct radio broadcast system and, accordingly, do not have access to the Internet. Thus, a need exists for a low-cost user terminal which provides users with the advantages of a satellite-based direct radio broadcast system (e.g., large geographic coverage, good sound quality, high outbound data rates and low cost), as well as bi-directional communication for global, portable Internet/WWW access capability.

SUMMARY OF THE INVENTION

In view of the foregoing disadvantages and limitations, it is an object of the present invention to provide a system and method for allowing global Internet access using low-cost, portable user terminals.

A further object of Se present invention is to make it possible for a user to obtain satellite direct radio broadcasts of audio programs, along with satellite direct radio broadcasts of data, including images, downloaded from the Internet or WWW.

A further object of the present invention is to use at least one identification code in a control word in a broadcast program to address a satellite direct radio broadcast channel to a selected user terminal.

It is a still further object of the present invention to allow a user terminal to communicate backhaul signals on a communication link connecting the user terminal to an Internet service provider's gateway, and to receive information from the Internet service provider, such as menu screens and web pages, via a satellite direct radio broadcast.

These and other objects of the present invention are achieved, in part, by providing remote users with user terminals which incorporate both broadcast receivers for receiving satellite direct radio broadcasts, and a communication device for communicating with an Internet service provider via a communication link separate from the satellite direct radio broadcast system.

In one aspect, therefore, the Internet service provider is configured to receive requests from a user terminal for Internet access via the communication link. The Internet service provider has a gateway configured to route multimedia data to be provided to the user from Internet/WWW to a broadcast station. The broadcast station formats the data into a broadcast program and transmits the broadcast program to a satellite in the satellite direct radio broadcast system. The user terminal can receive audio signals in the broadcast program and provide them to a speaker, as well as display image data and continue to interact with the Internet service provider via the communication device and an input device (e.g., a keyboard or mouse).

In another aspect, the communication link comprises a low earth orbit satellite and the communication device comprises a low earth orbit satellite transceiver.

In a still further aspect, the present invention is directed to a method for providing low-cost, global, portable user devices with Internet access. The method comprises the steps of generating a request for Internet access from a portable user terminal and transmitting the request to an Internet service provider using a first communication link. The Internet service provider subsequently determines if the user terminal is authorized to access the Internet and then provides subsequent screens and multimedia data requested by the user terminal to a broadcast station. The broadcast station downloads the screens and data to the user terminal via a satellite direct radio broadcast. The user terminal reproduces or processes the downloaded multimedia data as desired. The user terminal continues to enter responses and requests to the Internet service provider via the communication link and to receive broadcast screens and multimedia data from the satellite until the Internet access session is terminated.

BRIEF DESCRIPTION OF THE DRAWINGS

The various objects, advantages and novel features of the present invention will be more readily apprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
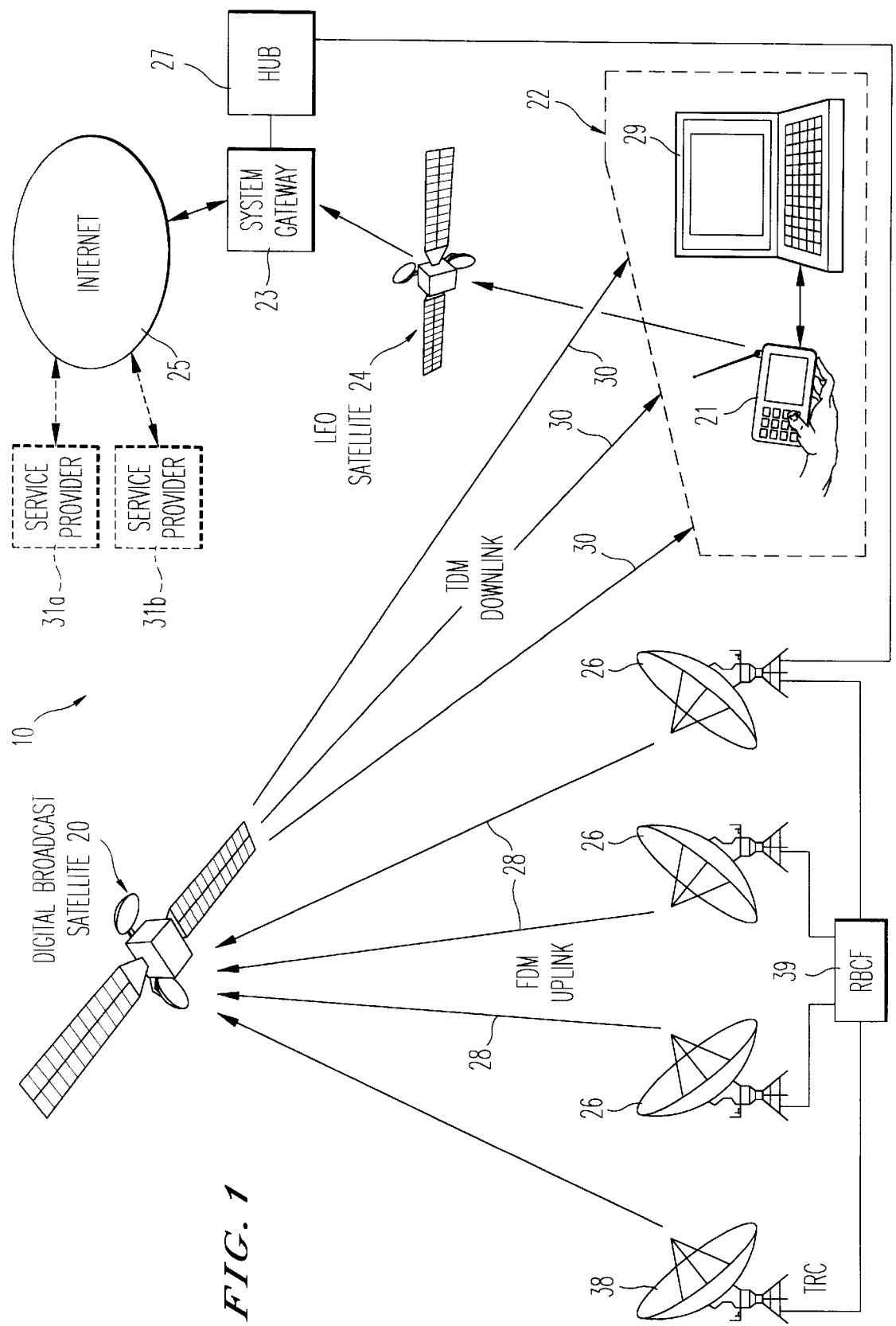
FIG. 1 is a diagrammatic illustration of the manner in which global, portable Internet access can be provided to users through a satellite direct radio broadcast system in accordance with a preferred embodiment of the present invention.

A global, portable Internet service system 10 for providing a remotely located user with the ability to receive high quality sound, data and images and to transmit information in accordance with the present invention is preferably implemented using a satellite direct radio broadcast system. The direct radio broadcast system preferably consists of three geostationary satellites (one of which is indicated at 20 in FIG. 1), low cost radio receivers or user terminals, and associated ground networks. For illustrative purposes, a single user terminal 22 is shown which comprises a handheld radio receiver 21 connected to a computer 29. One or more low earth orbit (LEO) satellites 24 are preferably used in accordance with the present invention to receive signals transmitted via the user terminals 22 and to forward the signals to at least one system gateway 23, for example. Thus, users can communicate with a system gateway 23 to access the Internet and World Wide Web (WWW), which are generally depicted at 25. The system gateway 23 can operate as an Internet service provider, as well as perform operations common to two or more Internet service providers, which are indicated generally at 31. As described in further detail below, the system gateway 23 provides a broadcast station 26 in the direct radio broadcast system with multimedia information from the Internet such as web pages, sound bites and other data for transmission to the user terminals 22 via the satellites 20. The global, portable Internet service system 10 therefore is advantageous because it can download relatively large amounts of data from an Internet service provider, for example, to a user terminal 22 efficiently and cost effectively using the satellite direct radio broadcast system, as well as transmit relatively small amounts of data such as backhaul data (e.g., menu selections) from a user terminal 22 to the Internet service provider via the LEO satellite link.

The preferred satellites 20 of the direct radio broadcast system cover the African-Arabian region, the Asian region and the Caribbean and Latin American regions from the following geostationary orbits:

21° E orbital location, providing service to Africa and the Middle East.

95° W orbital location, providing service to Central and South America.

105° W orbital location, providing service to Southeast Asia and the Pacific rim.

Coverage for other areas, such as North America and Europe, can be provided with additional satellites.

The direct radio broadcast system preferably uses the frequency band of 1467 to 1492 MHz, which has been allocated for Broadcasting Satellite Service (BSS) Direct Audio Broadcast (DAB) at WARC 92, that is, in accordance with resolutions 33 and 528 of the ITU. The broadcasters 26 use feeder uplinks in X band, from 7050 to 7075 MHz.

The direct radio broadcast system uses digital audio coding techniques. Each satellite delivers direct radio audio signals having qualities equivalent to AM monaural, FM monaural, FM stereo and CD stereo throughout its respective coverage area, together with ancillary data such as paging, video and text transmissions directly to the radios. The system can also deliver multimedia services such as large database downloads to PCs for business applications, map and printed text information for travelers, and color images to augment audio programs for advertising and entertainment.

The digital information assembled by a broadcast service provider (e.g., the system gateway 23) at a broadcast station 26 is preferably formatted in 16 kbps prime rate increments (PRIs) wherein n is the number of PRIs purchased by the service provider (e.g., n×16 kbps). The digital information is then formatted into a broadcast channel frame having a service control header (SCH). The SCH is useful to send data to each user terminal 22 tuned to receive the broadcast channel in order to control reception modes for various multimedia services, to display data and images, to send key information for decryption, and to address a specific user terminal, among other functions. The number of prime rate increments per program channel can range from 1 to 8, thus yielding a program channel bit rate of 16 to 128 kbps in 16 kbps increments. Each frame is preferably assigned n×224 bits for the SCH such that the bit rate becomes approximately n×16.519 kbps. Each frame is also preferably scrambled by the addition of a pseudo random bit stream to the SCH. Accordingly, information control of the scrambling pattern by a key permits encryption.

Each broadcast service provider selects the number of 16 kbps prime rate increments in accordance with the broadcaster's specific application. As stated previously, typical broadcast channel increments are preferably 16, 32, 64, 80, 96, 112 and 128 kbps. The satellite direct radio broadcast system described in connection with FIG. 1 is advantageous because it provides a common base of capacity incrementation for a multiplicity of broadcast companies or service providers whereby broadcast channels of various bit rates can be constructed with relative ease and transmitted to a user terminal 22. The size and cost of a broadcast station 26 can therefore be designed to fit the capacity requirements and financial resource limitations of a broadcast company. In addition, the broadcast company can allow a number of service providers to share the resources of the broadcast station with efficiency and cost effectiveness. A broadcast company of meager financial means can install a small VSAT terminal requiring a relatively small amount of power to broadcast a 16 kbps service that is sufficient to carry voice and music, for example, that has better quality than short-wave radio. On the other hand, a sophisticated broadcast company of more substantial financial means can broadcast FM stereo quality programs and other data using a slightly larger antenna and more power at 64 kbps. With further increases in capacity, the broadcast company can broadcast near compact disc (CD) stereo quality audio programs and larger amounts of data at 96 kbps, and full CD stereo quality audio programs and even larger amounts of data at 128 kbps.

The system gateway 23 preferably purchases a selected number of PRIs from a broadcast station 26 for transmitting multimedia information such as web pages to user terminals 22 at selected times during the day. The system gateway 23 is preferably able to transmit information to the user terminals 22 twenty-four hours a day via a broadcast station 26. The system can take advantage of the fact the users often request similar data for downloading during similar time frames. In accordance with an embodiment of the present invention, the system gateway 23 is operable to store data requested by many users for downloading within a predetermined period of time in a download buffer. The system gateway 23 can provide the broadcast station 26 with the identities of the user terminals 22 requesting the information. The broadcast station, in turn, can provide the SCH corresponding to the data stored in the download buffer with a number of identification codes for uniquely identifying each of the terminals for transmission of the requested data thereto.

To protect the broadcaster's program channel, a forward error correction (FEC) method is used. It comprises a Reed Solomon (255,223) coder concatenated with an interleaver, and a rate ½ Viterbi constant length 7 coder. This error correction coding (together with the addition of a sync header) elevates the prime rate channel to 19 kbps.

The FEC-coded broadcast channel frame is subsequently demultiplexed using a channel distributor at the broadcast station 26 into n parallel prime rate channels (PRCs), each carrying 16320 bits in terms of sets of 8160 two-bit symbols. The symbols are preferably assigned across the PRCs of a broadcast program in a round-robin fashion, as described below, such that the PRCs are spread on the basis of time and frequency, thereby reducing errors at the user terminal 22 caused by interference in transmission. A PRC synchronization preamble containing 48 symbols is subsequently placed in front of each group of 8160 symbols to synchronize the clock of the user terminal 22 clock for recovery of the symbols from the downlink satellite transmission. During on-board processing by a satellite 20, the PRC preamble is used to absorb timing differences between the symbol rates of uplink signals and the on-board clock used to switch signals and assemble downlink TDM streams. The n PRC frames, each comprising the PRC and the corresponding PRC preamble, are then differentially encoded, QPSK modulated on to IF carrier frequencies assigned as the broadcast channel for the service provider and up-converted to the X-band for transmission to the satellite 20. Thus, the transmission method employed at a broadcast station 26 incorporates a multiplicity of n Single Channel Per Carrier, Frequency Division Multiple Access (SCPC/FDMA) carriers into the uplink signal 28. These SCPC/FDMA carriers are spaced in a grid of center frequencies which are preferably separated by 38,000 Hertz (Hz) from one another and are organized into groups of 48 contiguous center frequencies or carrier channels.

Each satellite 20 is preferably equipped with three downlink spot beams, having beamwidths of about 6°. Each beam covers approximately 14 million square kilometers within power distribution contours that are 4 dB down from beam center and 28 million square kilometers within contours that are 8 dB down. The beam center margin may be 14 dB based on a receiver gain-to-temperature ratio of −13 dB/K.

Each satellite 20 carries two types of payloads. One is a "processing" payload that regenerates the uplink signals and assembles 3 TDM downlink carriers, and the other is a "transparent" payload that repeats the uplink signals on 3 TDM downlink carriers. The TDM signals from the two payloads are each transmitted in 3 beams, with the processed and transparent signals in each beam having opposite circular polarization (LHCP and RHCP). Each TDM dowmaink signal carries 96 prime rate channels in assigned time slots. To a user terminal 22, all of the TDM downlink signals appear the same, except for carrier frequency. The total capacity per satellite is 2×3×96=576 prime rate channels.

FIG. 1 illustrates the overall operation of a global, portable Internet service system 10 in accordance with a preferred embodiment of the present invention. In the case of the satellite processing payload, uplink signals 28 issue from broadcasters via individual frequency division multiple access (FDMA) channels from broadcast stations 26 located anywhere within the terrestrial visibility of the satellite 20 with elevation angles higher than 10°. Each broadcaster has the ability to uplink directly from its own facilities to one of the satellites 20 by placing one or more 16 kbps prime rate channels on the FDMA carriers. Alternatively, broadcasters which have no capacity for direct access to the satellite 20 may have access through a hub station. For example, the system gateway 23 can broadcast web pages directly to one of the direct radio broadcast satellites 20 or indirectly via a hub 27. Use of FDMA for the uplink offers the highest possible flexibility between multiple independent broadcast stations.

Conversion between uplink FDMA and downlink multiple-channel-per-carrier, time division multiplex (MCPC/TDM) in the direct radio broadcast system of FIG. 1 is achieved on board the satellite 20 by an on-board processor. At the satellite 20, each prime rate channel transmitted by a broadcast station 26 is demultiplexed and demodulated into individual 16 kbps baseband signals. Individual channels are routed via a switch to one or more of the downlink beams 30, each of which is a single TDM signal. This baseband processing provides a high level of channel control in terms of uplink frequency allocation and channel routing between uplink and downlink. Uplink signals are received in the satellite in X band and converted to L band by the on-board processor. The downlinks 30 to the user terminals 22 use MCPC/TDM carriers. One such carrier is used in each of the three beams on each satellite 20. The manner in which the direct radio broadcast system formats the FDMA uplinks and performs payload processing to generate the TDM downlinks permits reception of a significant amount of data, including high sound quality audio programs, using low cost receivers, among other advantages.

For the transparent payload, the TDM signals are assembled at a broadcast station and appear in precisely the same structure as do those assembled on board the satellite 20 by the processing payload. The TDM signal is sent to the satellite in the X band and is repeated in the L band in one of the three downlink beams. The power level is the same for downlink TDM signals generated by the processing payload.

Figure 2:
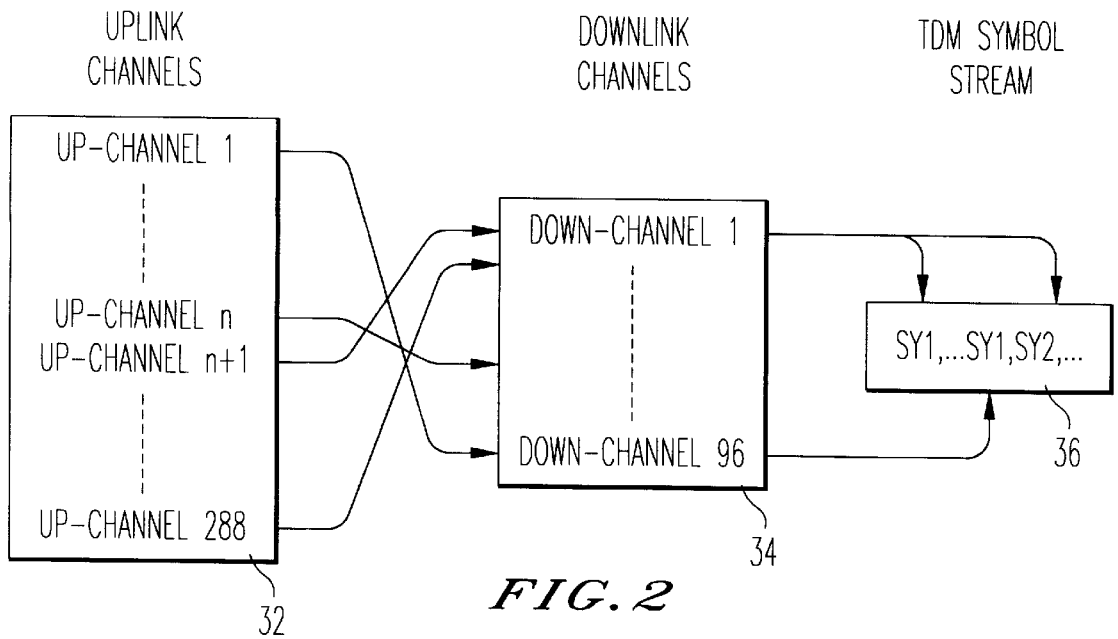
FIG. 2 illustrates the reallocation of information from uplink frequency division multiple access channels into a downlink time division multiplexed channel in a satellite direct radio broadcast system of the type shown in FIG. 1.

FIG. 2 illustrates the on-board re-allocation of prime rate channels from uplink frequency division multiple access channels into a downlink MCPC/TDM channel in the processing payload of the satellite 20 of FIG. 1. The overall uplink capacity is preferably between two hundred eighty-eight (288) and three hundred eighty-four (384) prime rate uplink channels 32 of 16.519 kbps each. Ninety-six (96) prime rate channels 34 are selected and multiplexed for transmission in each downlink beam 30, and time division multiplexed onto a carrier of approximately 2.5 MHz bandwidth as indicated at 36. Each uplink channel may be routed to all, some or none of the downlink beams. The order and placement of prime rate channels in a downlink beam is fully selectable via a command link from a telemetry, range and control (TRC) facility 38, shown in FIG. 1.

Software is preferably provided at a broadcast station 26 or, if more than one broadcast station 26 exists in the system 10, in a regional broadcast control facility 39 to assign space segment channels in the uplink beam to a satellite 20. The regional broadcast control facility 39 is preferably connected to the TRC facility 38 via a communication link. The software optimizes use of the uplink spectrum by assigning PRC carriers whenever space is available in the 48 channel groups. The carriers associated with a particular broadcast channel need not be continuous within a group of 48 carrier channels and need not be assigned in the same group of 48 carrier channels.

The carrier frequencies in each downlink beam 30 are different to enhance beam-to-beam isolation. Each TDM downlink channel is operated in the satellite payload at saturation, giving the highest possible power efficiency in terms of link performance. Use of single carrier per transponder operation achieves maximum efficiency in the operation of the satellite communication payload in terms of conversion of solar power into radio frequency power. This is far more efficient than techniques requiring simultaneous amplification of a multiplicity of FDM carriers. The system produces high receive margins suitable for stationary and mobile reception indoors and outdoors.

The system 10 carries out audio source coding using MPEG 2.5, Layer 3 which achieves the cited qualities at bit rates of 16, 32, 64 and 128 kbps, respectively, and also includes the capability to perform 8 kbps coding. Image coding is carried out using the JPEG standard. Error rates over the system are less than $10^{-10}$ and thus are suitable for high quality digital image and data transmission for multimedia services. The MPEG 2.5, Layer 3 coding offers a better bit rate efficiency than the previous MPEG 1, Layer 2 (Musicam) or MPEG 2 standards for the same audio quality. For audio broadcasts, the digitally coded source bit rates are:

8 kbps for utility monophonic voice;

16 kbps for non-utility monophonic voice;

32 kbps for monophonic music, with near FM quality;

64 kbps for stereophonic music, with near FM quality; and 128 kbps for stereophonic music, with near CD quality.

In the preferred implementation of the satellite direct radio broadcast system, each satellite 20 has the capacity to transmit a total of 3072 kbps per beam (including the 2 TDM carriers for the processing and transparent payloads, respectively), which may be any combination of the above audio services. This corresponds to a capacity per beam of:

192 monophonic voice channels; or 96 monophonic music channels; or 48 stereophonic music channels; or 24 CD stereophonic music channels; or any combination of the above signal qualities.

The overall satellite direct radio broadcast system delivers the digital signals with a bit error rate (BER) of $10^{-4}$ or better, providing the various service qualities previously defined. For each downlink beam 30 in L band transmitted by the satellites 20, the Edge Of Coverage EIRP of the TDM carrier is 49.5 dBW. This EIRP, together with specific Forward Error Correction, insures a minimum 9 dB margin for a $10^{-4}$ BER, using the baseline radio receiver antenna. This margin helps combat signal loss due to obstacles in the path between the satellite 20 and the receiver at the user terminal 22, providing full quality reception in the intended coverage area.

User terminals 22 in obstructed locations can be connected to a high gain antenna, or to an antenna located in an unobstructed position. For example, reception in large buildings may need a common roof antenna with indoor retransmission for the entire building, or individual reception antennas near a window. At the 4 dB down contour of the earth coverages, the channels have an estimated margin of 10 dB relative to the power density needed to deliver a bit error rate of $10^{-4}$. At beam center this margin estimate is 14 dB.

The operating margin of the direct radio broadcast system does not change for the higher bit rates. Within the 4 dB contour, most user terminals 22 view the satellite 20 at elevation angles of greater than 60°, making interference from structures virtually nil. In some beams, within the 8 dB contour the elevation angle to the satellite 20 is greater than 50°, which may experience occasional interference due to reflections or blockage from structures. Line of sight reception even at low elevation angles (10° to 50°) is always possible with small 8 dBi gain antennas in some beams pointed toward the horizon.

Figure 3:
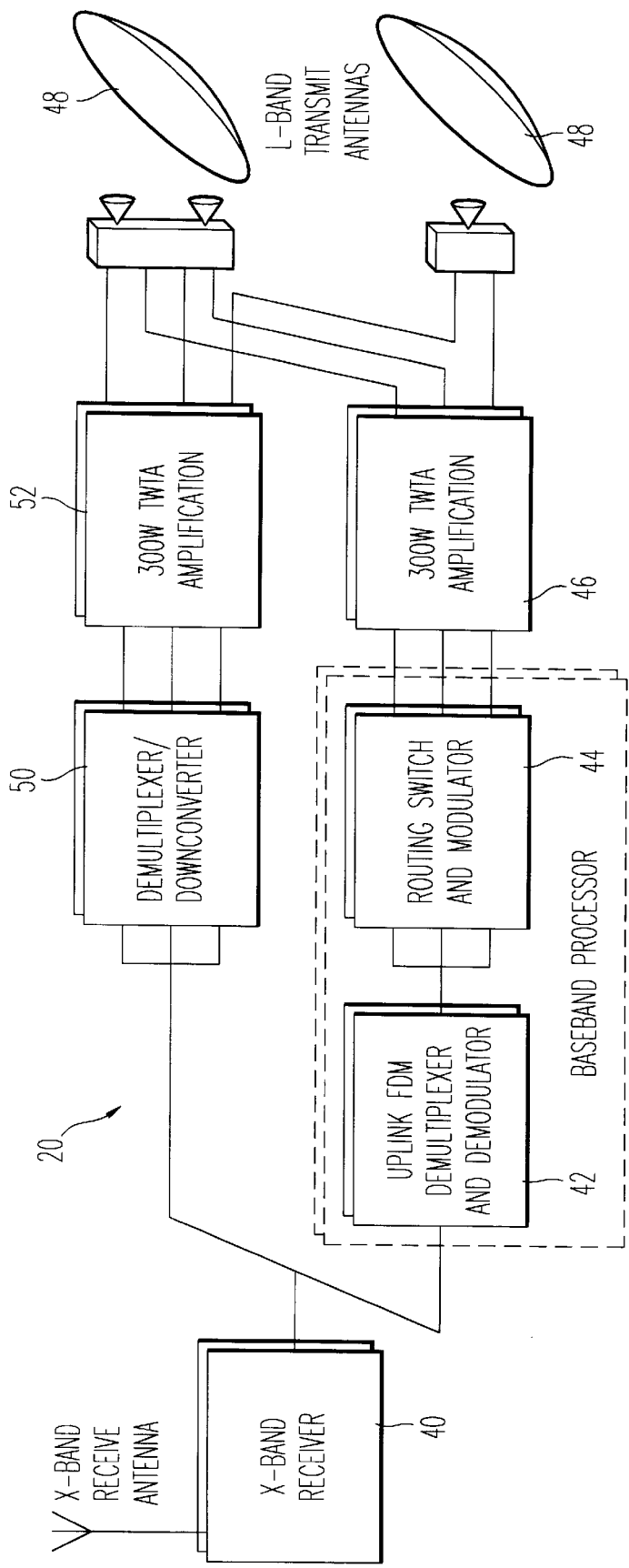
FIG. 3 illustrates the manner in which on-board satellite signal processing may be carried out in a satellite direct radio broadcast system of the type shown in FIG. 1.

As stated previously, the direct radio broadcast system includes a baseband processing payload in the satellite 20. Baseband processing allows improved system performance for uplink and downlink link budgets, management of broadcast stations, and control of the downlink signals. FIG. 3 illustrates satellite signal processing in the satellite direct radio broadcast system. The coded prime rate uplink carriers are received at an X-band receiver 40. A polyphase demultiplexer and demodulator 42 receives the 288 individual FDMA signals in 6 groups of 48, generates six analog signals on which the data of the 288 signals is divided into 6 time multiplexed streams, and performs demodulation of the serial data on each stream. A routing switch and modulator 44 selectively routes individual channels of the serial data into all, some or none of three downlink signals, each carrying 96 channels, and further modulates them onto the three downlink L-band TDM signals. Traveling wave tube amplifiers 46 boost the power of the three downlink signals, which are radiated to earth by L-band transmit antennas 48. The transparent payload also comprises a demultiplexer and downconverter 50 and an amplifier group 52, which are configured in a conventional "bent pipe" signal path to frequency convert uplink TDM/MCPC signals for retransmission at L band.

The satellites 20 are operated by a ground control segment (e.g., the software available at a single broadcast station 26 or a RBCF 39 servicing a number of broadcast stations 26) and managed according to traffic requirements by a mission control segment during the orbit lifetime. The bit rates and consequently the service qualities can be mixed in any beam to meet the demand for service. The bit-rate/quality complexion of a service can be easily changed from ground command and can vary at different times of the day. In the preferred embodiment, channel allocation can be changed on an hour-by-hour basis according to a program schedule established twenty-four hours in advance. It is to be understood, however, that channel allocation can be changed on a more or less frequent basis.

Figure 4:
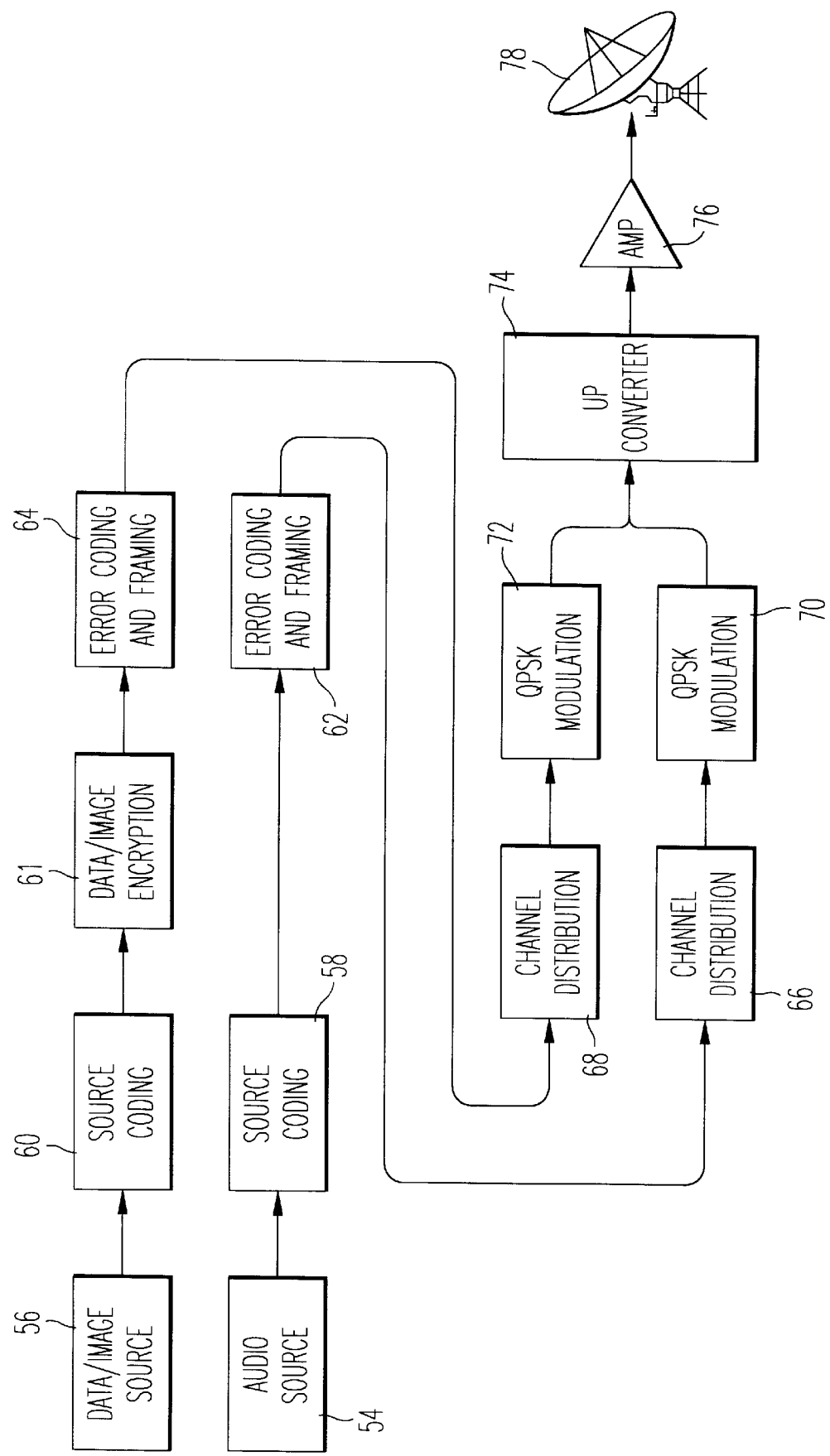
FIG. 4 is a block diagram illustrating the manner in which data and images from the Internet may be combined with audio at a broadcast station and uplinked to the digital broadcast satellite of FIGS. 1–3.

A block diagram of a broadcast station 26 servicing two service providers which may be used in connection with the present invention is illustrated in FIG. 4. Two sources are shown in FIG. 4 for illustrative purposes, one source 54 providing audio programming and the second source 56 providing data which may be desired by certain users. (It will be understood that this arrangement is merely exemplary, and that the broadcast station 26 may transmit both audio programming and data, if desired. Moreover, the number of sources could be greater than two.) The data may consist of maps, charts, satellite or radar generated images, computer screens such as browser or menu screens providing user options and web pages, among other types of data.

As will be apparent from FIG. 4, the processing of digital data from the audio source 54 and from the data source 56 is essentially the same. The audio and data sources 54 and 56 are first subjected to MPEG or JPEG source coding in blocks 58 and 60. The source coded data is then encrypted in block 61, using an encryption method which can be decrypted using a decryption key. (optionally, the source coded audio can also be encrypted, but this is not shown in FIG. 4.) The source coded (and, in the case of the data, encrypted) digital signals are then forward-error-correction coded in blocks 62 and 64, using a concatenated channel coding scheme comprising a Reed Solomon (255,233) block coder, block interleaving and rate ½ Viterbi convolutional coding.

Use of such a concatenated coding scheme contributes to the low bit error rate achieved over the system. Channel coding multiplies the bit rate needed for transmission by a factor of 2×255/223. Thus, the prime rate is increased to 37.78 kilobits per second after error coding.

Depending on the program channel rate, the symbols of the coded program channels are split among a set of coded prime rate transmit channels. For example, a 128 kbps channel is split into eight prime rate channels as follows:

Symbol 1 into physical channel 1
Symbol 2 into physical channel 2
Symbol 3 into physical channel 3
Symbol 4 into physical channel 4
Symbol 5 into physical channel 5
Symbol 6 into physical channel 6
Symbol 7 into physical channel 7
Symbol 8 into physical channel 8
Symbol 9 into physical channel 1 . . . etc.

The SCH inserted into each coded PRC preferably comprises a control word to identify the program channel to which the PRC belongs and to carry instructions that allow the receiver to recombine the coded prime rate channels to reconstruct the coded program channels. An exemplary eighty (80) bit control word is:

| # Bits | Indication |
|---|---|
| 2 | Quantity Of Related Ensembles<br>(00 = no relation, four related ensembles maximum) |
| 2 | Ensemble Identification Number<br>(00 = Ensemble #1, 11 = Ensemble 4) |

-continued

| # Bits | Indication |
|---|---|
| 4 | Ensemble Type<br>(0000 = Audio, 0001 = Video, 0010 = Data, other types or reserved) |
| 3 | Quantity of 16 kbps Prime Rate Channels In Ensemble<br>(000 = 1 channel, 001 = 2 channels, . . . , 111 = 8 channels) |
| 3 | Prime Rate Channel Identification Number<br>(000 = channel 1, . . . , 111 = channel 8) |
| 3 | Quantity Of Sub-Ensembles<br>(000 = 1, . . . , 111 = 8) |
| 3 | Quantity Of 16 kbps Prime Rate Channels In Sub-Ensemble<br>(000 = 1, . . . , 111 = 8) |
| 2 | Sub-Ensemble Identification Number<br>(000 = Ensemble #1 . . . , 111 = Ensemble 8) |
| 3 | Ensemble/Sub-Ensemble Blocking<br>(000 = no blocking, 001 = type 1 blocking, . . . , 111 = type 7 blocking) |
| 11 | Reserved |
| 40 | CRC. |

The control word entry for the Quantity of Related Ensembles allows a relationship to be created between various groups of ensembles. For example, a broadcaster may wish to provide related audio, video and data services, such as electronic newspaper with audio text, and additional information. The Ensemble Identification Number identifies the ensemble number of which the channel is a part. The Quantity Of 16 kbps Prime Rate Channels In Ensemble defines the number of prime rate channels in the ensemble. The Quantity Of Sub-Ensembles and Quantity of 16 kbps Prime Rate Channels In Sub-Ensemble defines a relationship within an ensemble, such as, in a CD quality stereo ensemble, use of four prime rate channels for a "Left Stereo" signal and four different prime rate channels for a "Right Stereo" signal. Alternatively, music may be associated with multiple voice signals for announcers, each voice signal in a different language. The Quantity Of 16 kbps Prime Rate Channels In Sub-Ensemble defines the number of prime rate channels in the sub-ensemble. The Sub-Ensemble Identification Number identifies the sub-ensemble of which the channel is a part.

The Ensemble/Sub-Ensemble Blocking bits allow cooperative blocking of broadcast information. For instance, some countries may prohibit advertising for alcohol. User terminals 22 produced for that country can be preset with a code, or a code can otherwise be loaded, so that the user terminals respond to the blocking signal and block the specific information. The blocking function can also be used to restrict the dissemination of sensitive information (such as military or governmental information), or to restrict revenue-bearing broadcast services to certain users.

As stated previously, each PRC is organized into frames having at least a PRC preamble to provide a timing reference between the broadcast station and the satellite. The preamble may include a unique word to identify the start of the block coding for each frame. The preamble may also include a block of timing bits containing 48 two-bit symbols. When the broadcast station and the satellite are synchronized, the block contains 47 symbols. If, due to differences in oscillators in the satellite and broadcast station, the broadcast station lags behind or moves ahead by one symbol, the block of timing symbols is shortened or lengthened accordingly. All channels may use the same preamble. The preamble can comprise an identification code to allow the channel to be received only by that user terminal 22 from which the request for information originated. When a source has been split among multiple prime rate channels, the preambles for all related channels are preferably coincident. There is no master clock synchronization between separate broadcast stations. Addition of the control word and preamble code raises the transmitted prime channel rate to 38 kilobits per second. As stated previously, the SCH can be provided with an identification code to address a particular user terminal 22 in lieu of, or in addition to, the insertion of a code in the PRC preamble.

As stated previously, each coded program source is divided into individual prime rate channels. As an example, the audio source 54 may comprise four prime rate channels, which represents an FM quality stereo signal. Alternatively, audio source 54 may comprise six prime rate channels, which can be used as a "near CD" quality stereo signal, or an FM quality stereo signal linked to a 32 bit data channel (e.g., for transmitting a signal for display on a radio receiver liquid crystal display (LCD)). As a further alternative, the six prime rate channels can be used as a 96 kbps broadcast data channel. The image source may comprise only one 16 kbps channel or several channels. As will be described in further detail below, user terminals 22, relying on ensemble information included in the TDM frame and in each prime rate channel, preferably automatically select those prime rate channels necessary to preferably generate the user-selected digital audio program or other digital service program.

With continued reference to FIG. 4, the PRCs are distributed by channel distribution blocks 64 and 68 to QPSK modulation blocks 70 and 72, respectively. Within each QPSK modulation block 70 and 72, a separate QPSK modulator (not shown) modulates each prime rate channel to an intermediate frequency. An upconverter 74 moves the separate prime rate channels to the FDMA uplink band, and the upconverted channels are transmitted through amplifier 76 and antenna 78. Broadcast uplink stations preferably use VSAT signals for transmission of elementary (16 kbps) channels, using small antennas (2 to 3 meters in diameter).

The prime rate uplink channels are transmitted to the satellite 20 on individual FDMA carriers. As stated previously, up to 288 uplink prime rate carriers can be transmitted to the satellite 20 in its global uplink beam. Small broadcasters' earth terminals equipped with 2.4 meter diameter parabolic X-band antennas and 25 watt power amplifiers can easily transmit a 128 kilobit per second program channel (comprising 8 of the prime rate channels) to the satellite 20 from a site in the country originating the program. Alternatively, program channels can be connected to shared uplink earth terminals via leased PSTN terrestrial links. The system has adequate uplink capacity for every country in its world coverage to have its own satellite radio broadcasting channel.

Figure 5:
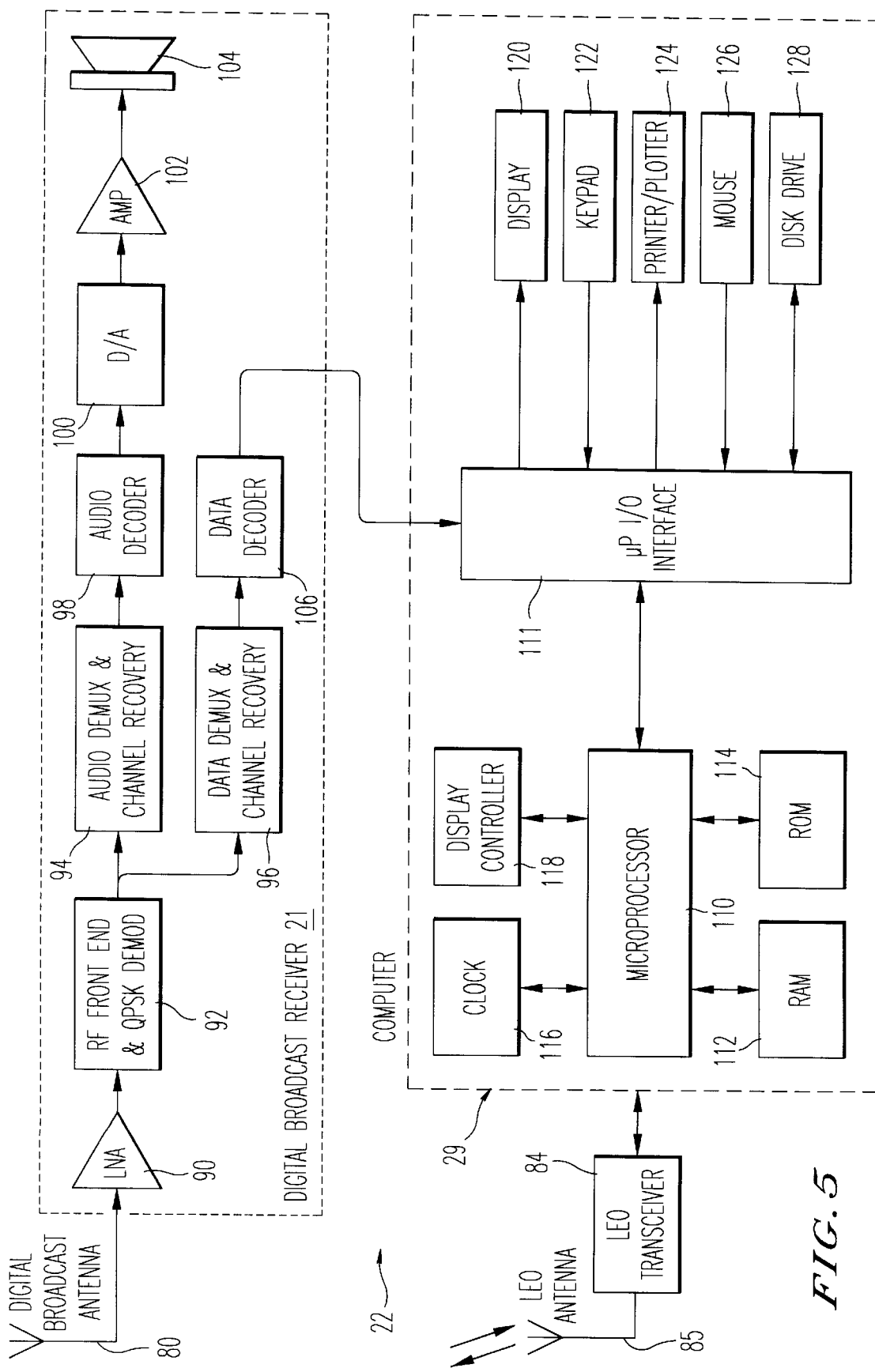
FIG. 5 is a block diagram illustrating the construction of a user terminal which incorporates both a digital broadcast receiver and a LEO satellite transceiver in accordance with a preferred embodiment of the present invention.

A block diagram of one of the user terminals 22 of FIG. 1 is provided in FIG. 5. The user terminal 22 receives the L band signal from the satellite 20, demodulates and extracts from the TDM stream the useful audio or image signal, and reproduces the desired audio or image information. The user terminal may be equipped with a small compact patch antenna 80 having about 4 to 6 dBi gain, which will require virtually no pointing. The user terminal 22 tunes automatically to selected channels. An alternative higher end user terminal may be equipped with an antenna that achieves 10 to 12 dBi of gain. Since such an antenna would be quite directional, it is pointed to achieve best reception. One version of this antenna may be an array of patches. The array may be embedded conformally into the surface of the user terminal case, attached as a lid, or be completely detachable and connected to the user terminal by a thin coax cable a few meters long. Another version of the antenna could be a helix operating in either a broadside or end-fire mode. Pointing is done by rotating the antenna in elevation and azimuth. A detachable antenna can be mounted on a small tripod on the ground or mounted to a window frame and pointed to achieve best reception. A 10 dBi antenna has a beam width of approximately 65° and consequently will be easy to point at the satellite 20 for achieving optimum reception. The directivity of this antenna will further enhance reception in locations where reflections might otherwise cause interference. A phased array, rod shaped antenna with wide beam-width in one dimension but narrow in the other (i.e., a fan beam) is another alternative. Yet an alternate antenna is a helical antenna for outdoor reception and most indoor reception. In certain environments (mask, concrete or metal buildings), indoor reception may require connection to an external antenna. For reception by mobile user terminals, antennas with as little as 4 dBi of gain may be mounted on the vehicle. A single antenna of this type operates very well in an open location at high elevation angles, devoid of severe multipath reflectors. However, in an area having multipath reflections, such as downtown cities, where elevations are less than 60°, measures may occasionally have to be taken to mitigate the multipath interference. One such measure is to use two or three of the 4 dBi gain antennas in a spatial diversity array mounted at various locations on the vehicle. These can be dynamically added to achieve directivity or combined so as to pick the maximum signal arrival at a given instant. Another alternative is to install a steerable directional antenna with 10 dBi of gain and cause it track the satellite 20. This latter idea is expensive but may be preferable to obtain maximum benefit from the high performance quality offered by the system. As satellite mobile systems come into worldwide use in the next decade, electronically steerable array antennas are expected to drop in price and become generally affordable.

Time division multiplexed, multiple channel per carrier techniques (MCPC/TDM) are used for downlink transmission to the user terminal 22. Each of the prime rate (16.519 kilobits per second) channels occupies its own time slot in the time division stream. These prime rate channels are combined to carry program channels ranging from 16 to 128 kilobits per second. Use of digital techniques allows for ancillary services to the radio including low rate video, paging, mailing, fax, use of flat display screens, or serial data interfaces. This data and information may be multiplexed within the audio digital signal channels. In addition, the prime rate channels can carry program channels that are primarily screens (e.g., a homepage from the WWW) for display at the user terminal with or without an audio program, and downloaded data for storage and/or printing.

Each user terminal 22 can tune to one of the TDM carriers transmitted in one of the beam coverages. As shown in FIG. 5, the user terminal 22 includes a digital broadcast receiver 21 and antenna 80, a LEO transceiver 84, an antenna 85, and a computer 29. The receiver 21 can be connected to a serial port of the computer 29, for example. An Internet service provider such as the system gateway 23 of FIG. 1 can operate in one, two or all of the beam coverages of the three satellites 20. The Internet service provider preferably notifies a user of the L band frequency to which the digital broadcast receiver 21 needs be tuned prior to accessing the Internet in order to receive information from the provider. As stated previously, the Internet service provider can change the FDM uplinks assigned thereto and the manner in which the information is routed on-board the satellite 20 to one or more of the downlink beams via software and telemetry control.

Within the digital broadcast receiver 21, a low noise amplifier 90 boosts the satellite signal, and the boosted signal is received by an RF front end and QPSK demodulator 92. The output of the RF front end and QPSK demodulator 92 is connected to a first time division demultiplexer 94 which recovers the audio prime rate channels, and to a second time division demultiplexer 96 which recovers the prime rate channels carrying data including images.

After the n PRCs of a received broadcast channel are realigned, the symbols of each PRC are remultiplexed into an FEC-coded broadcast channel using blocks 94 and 96. The output of the block 94 is a baseband digital signal carrying audio information, and the output of the block 96 is a baseband digital signal carrying data.

The recombined coded program channels thus recovered are decoded and deinterleaved to recover the original baseband prime rate bit stream that entered the system at the broadcaster's earth station 26. In the case of audio data, the recovered bit streams are converted back to an analog audio signal by an audio decoder 98 and a digital-to-analog converter 100. The analog signal is boosted by an amplifier 102 and is reproduced by a loudspeaker 104. The user terminal can reproduce various audio qualities ranging from AM monaural to CD stereo depending on the program channel bit rate. In the case of data, the recovered bit streams can be converted to a displayable format by an data/image decoder 106. In addition to being displayed, the received data can be saved to a memory device or printed.

The instructions needed for the user terminal 22 to control recombination of the coded prime rate channels into the coded program channels are preferably contained in the control words embedded in each coded prime rate channel and in the original baseband prime rate bit stream (e.g., in the SCH or the PRC preamble). The receiver 21 is programmed to process the instructions in the control words.

The principal components of the computer 29 include a microprocessor 110 having suitable amounts of random access memory (RAM) 112 and read-only memory (ROM) 114, a real-time clock 116 and a display controller 118. The display controller 118 controls the formatting of image data (e.g., map data) to a display 120. The microprocessor 110 is preferably also connected to a keypad 122, a printer/plotter 124, a mouse 126 and a disk drive 128. A microprocessor input/output (I/O) interface 111 is illustrated to represent the serial and parallel ports of the microprocessor 110. As shown in FIG. 5, the data decoded by the receiver 21 can be provided to the computer 29 via a serial port connection. The keypad 122 and the mouse 126 are used for selecting broadcast programs, controlling sound levels, making menu selections, and similar functions. Menus and screens can be generated on the display 120 in accordance with program code for the microprocessor 110 or a received homepage. The printer/plotter 124 allows the user to receive a hard copy output of any received data (including images), in addition to viewing the data on the display 120. Finally, the disk drive 128 allows data or programs to be loaded into the computer 29, and also allows received data to be stored for later viewing or printing. One possible function of the disk drive 122 may be, for example, to allow the computer 29 to merge images or other data that are being received in real time by the digital broadcast receiver 21 with preexisting data stored on a magnetic diskette. This is useful, for example, in allowing an existing image or other data to be updated by transmitting only the new or modified information, without requiring the existing image or data to be transmitted.

The components of FIG. 5 can be incorporated into a single case that is designed for portable or mobile use. Alternatively, as shown in FIG. 1, the receiver 21 can be a hand-held device connected to a separate computer 29. Power may be provided by batteries, solar cells or a generator driven by a spring motor or hand crank. If the user terminal 22 is carried by vehicle such as a boat, aircraft or automobile, power may be provided by the vehicle's power supply. As an alternative to housing all of the components of the user terminal 22 in a single case, the user terminal 22 may be made up of a system or network of separate components interconnected by suitable cables.

Figure 6:
FIGS. 6–8 illustrate three different ways in which images and data from the Internet can be downlinked from the digital broadcast satellite of FIGS. 1–3.
Figure 7:
Figure 7:
Figure 8:
Figure 8:
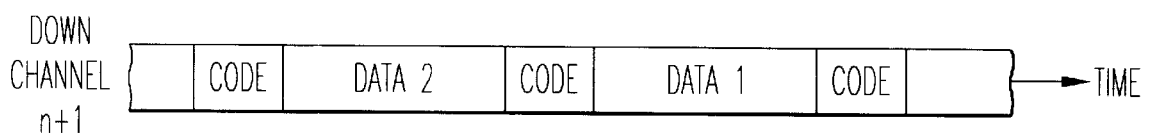

FIGS. 6 through 8 illustrate three different ways in which different types of data can be transmitted on the downlink TDM channels 30 of FIG. 1. In FIG. 6, the data is transmitted in the "dead time" between audio programs, and preamble or identification codes are used to distinguish audio programs and data. As an example, audio programs may be transmitted during daylight hours on a given TDM downlink channel (or set of TDM downlink channels), but the same channel (or channels) may carry data during late evening or early morning hours when there is less demand for audio programs. In FIG. 7, the audio programs and data occupy different TDM downlink channels and can therefore be transmitted continuously. This option would be desired in cases where the data consists of weather maps or other data that must be available on an around-the-clock basis and must be updated very frequently. FIG. 8 is similar to FIG. 7 in that separate TDM channels are used for the audio programs and data, but in this example different types of data are transmitted at different times on the data channel and are separated from each other by preamble or identification codes. Thus, for example, a broadcaster may transmit a first type of data during a first period of time, and another type of data during a second period of time. By tuning to the data channel at the appropriate time (which may be listed in a published schedule), or by programming the user terminal 22 to automatically detect a specific code corresponding to the user or user terminal, the user may select the desired data for display, printing and/or storage. As stated previously, an identification code can be provided in the broadcast signal which, when detected by a user terminal 22, allows that user terminal 22 to demodulate and decode the data. Thus, an Internet service provider can address a selected user terminal 22 to provide, for example, a homepage requested by that terminal and no other terminal.

By way of example, a computer can provide data requested by a user to a broadcast station 26. The broadcast station, in turn, generates prime rate channels comprising the requested data, and an identification code associated with the user terminal 22. The user terminal 22, therefore, can recognize those channels among the broadcast channels recovered from the TDM downlink channels 30 that contain the requested data. The identification code is preferably assigned to the user by an Internet service provider when the user subscribes to the provider for Internet access via a user terminal 22. The Internet service provider can provide the user with an identification code, a password, or both, and require that one or both of these items be entered via the keypad 122 or card reader 126 before a web browser screen, for example, is transmitted to the user terminal 22. Alternatively, the LEO transceiver 84 can comprise a wireless modem that is recognized by the Internet service provider after the user initiates a log-in sequence using the user terminal 22.

Figure 9A:
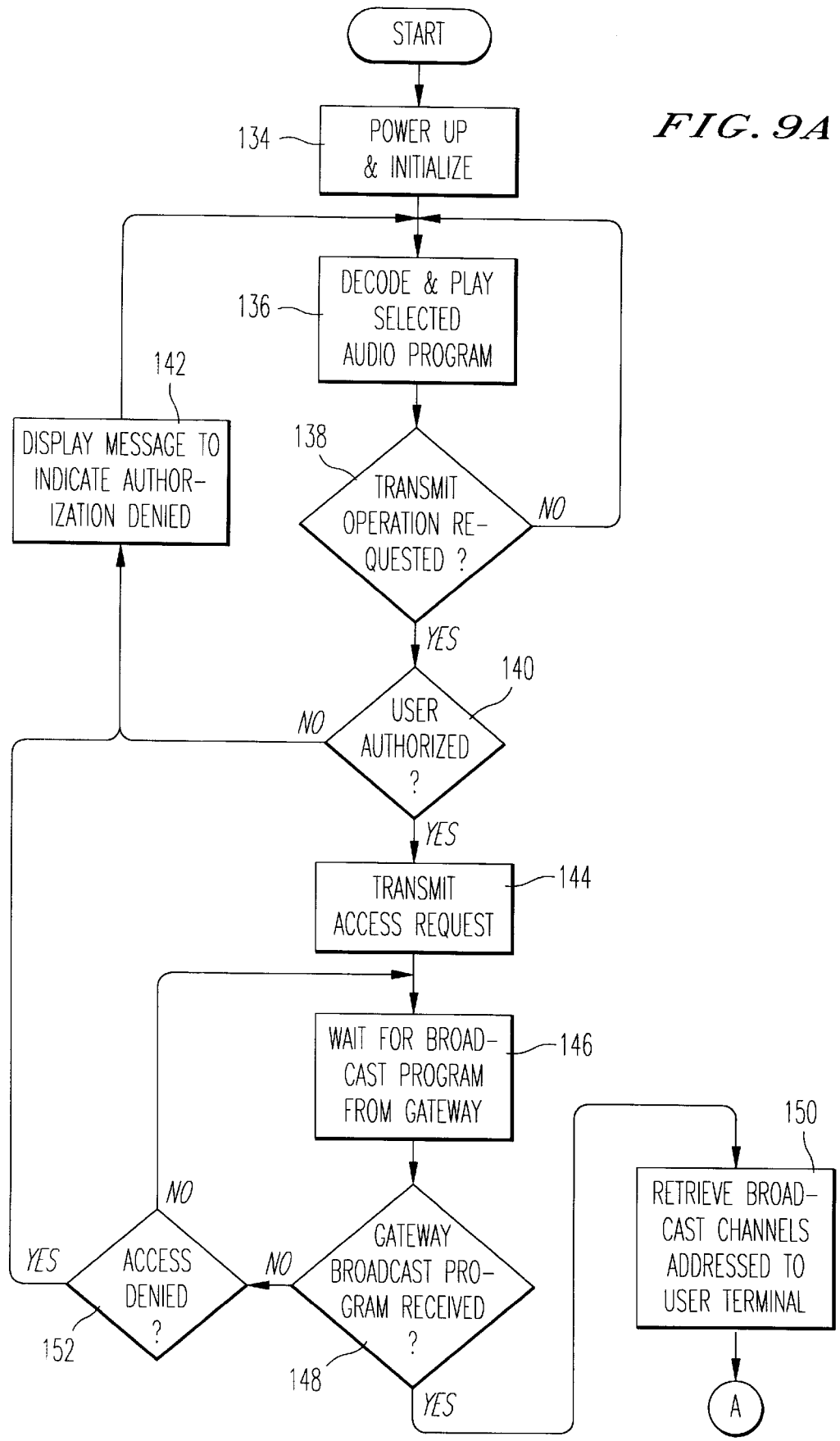
FIGS. 9A and 9B are flow charts which summarize the series of operations carried out by the user terminal of FIG. 5 when Internet image or data transmission operations are desired.
Figure 9B:
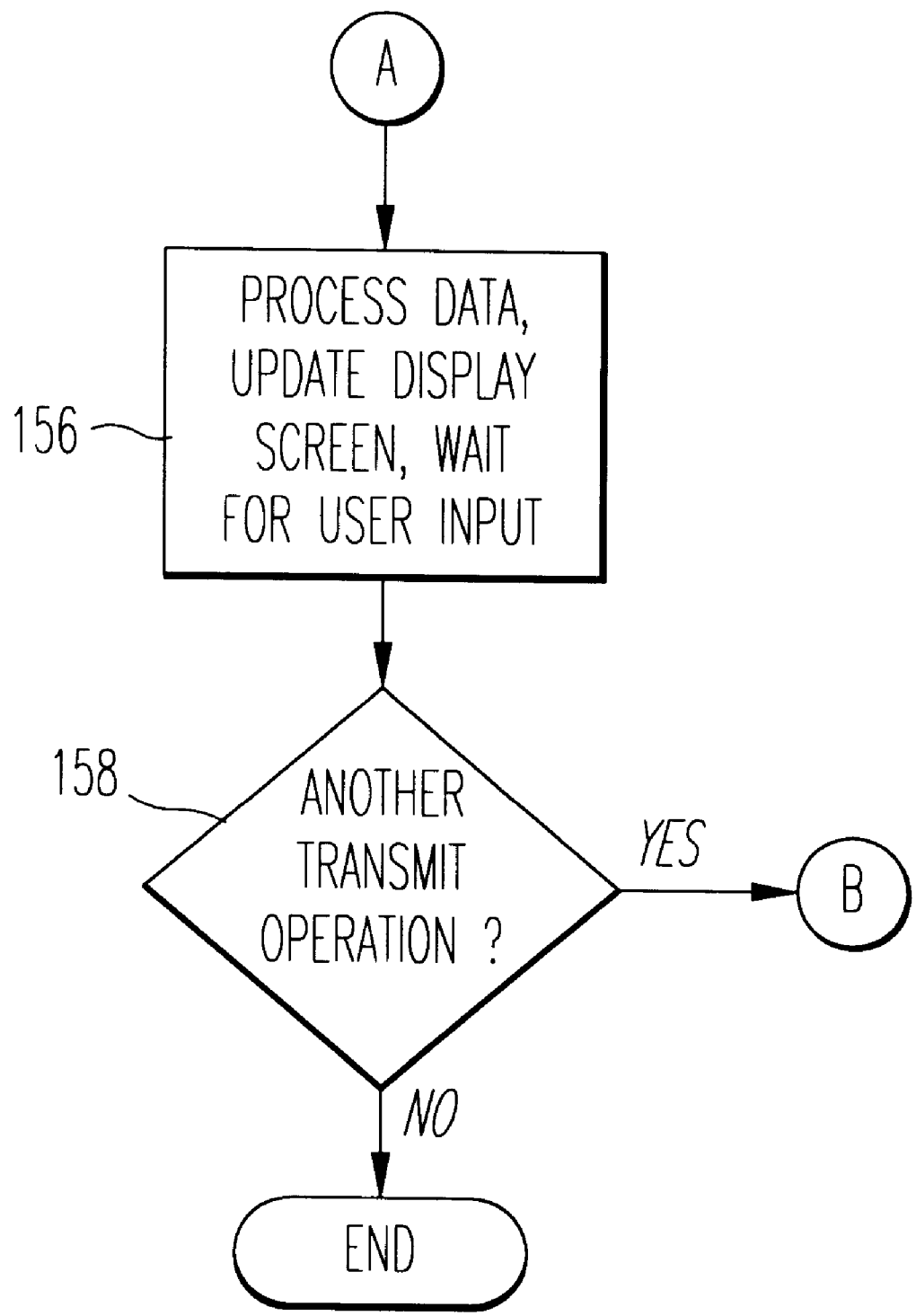

FIGS. 9A and 9B are flow charts which summarize the basic series of operations carried out by the user terminal 22 of FIG. 5 when audio programs and data are received. It will be understood that, due to the TDM format of the downlink channels, the user terminal 22 is capable of receiving and reproducing audio programs and data simultaneously. Thus, except in cases where the selected audio program and the desired data alternate on the same TDM downlink channel (as illustrated in FIG. 6), the user is not required to stop listening to an audio program in order to receive images or other types of data. As a result, a user who wishes to obtain selected data, for example, can do so while continuing to listen to audio programs on the audio program channel.

With specific reference now to the logic sequence shown in FIGS. 9A and 9B, the first step in the program is a power-up and initialization step that is carried out in block 134. After this step, the program proceeds to block 136, where the user terminal 22 decodes and plays an audio program which has been selected by the user. In block 138, the microprocessor 110 checks to determine whether a transmit operation (e.g., a request to access an Internet service provider) has been requested by the user. Typically, the user will make such a request by using the keypad 122 or the mouse 126 of FIG. 5 to choose a menu selection displayed by the display 120. The display 120, for example, can display a screen prompting the user to enter an identification code (e.g., via the keypad 122 or card reader 126) or simply to click on a button to initiate the process of connecting to the Internet service provider via the LEO satellite 24. If no transmit operation has been requested, the program returns to block 136 and continues to play the selected audio program. However, if a transmit operation has been requested, the program proceeds to decision block 140 and checks to determine whether the user is authorized to connect to the Internet. This determination can include a check of the identification code and password with similar information stored in the RAM 112 or ROM 114 for authorized users of that particular user terminal 22. Alternatively, this determination can include a check of the prepaid balance on the user's debit card 130 or 130' (which has been inserted by the user into the card reader 126) and a check of the user's decryption key to be sure that it is valid. If either of these checks fails, a user message is displayed on the display 120 in block 142 to inform the user that proper authorization does not exist.

If the user has proper authorization, the LEO transceiver 84 subsequently transmits the identification code, password, if used, and/or a simple access request created by the microprocessor 110 in accordance with program code to one or more system gateways 23 via a LEO satellite 24 (block 144). The system gateway 23 verifies that the user has access by comparing the address of the LEO transceiver 84 or the user identification code with authorization data stored in a database by the system gateway 23. In accordance with another embodiment of the present invention, the system gateway 23 determines if the user is authorized to access the Internet, as opposed to the computer 29. If the user is authorized to have Internet access, the system gateway 23 sends an Internet homepage or Web browser information to the user terminal via an FDM uplink 28 of the direct radio broadcast system. The user identification code used for authorized access to the Internet need not be the same as the identification code assigned by the gateway 23 or the broadcast station 26 to transmit Internet data to a selected user terminal 22.

A check is made (either automatically or manually) to determine whether the desired data has been broadcast within a predetermined amount of time (blocks 146 and 148). The computer 29 is programmed to monitor the recovered original baseband prime rate bit stream for information addressed to the user terminal 22 (block 150), as indicated by control words inserted in the prime rate bit stream, and to generate a message on the display 120 to indicate when Internet access has been denied or the desired data has not been broadcast within the predetermined amount of time (as indicated by the affirmative branch of decision block 152).

After the TDM data stream is detected and the baseband data stream recovered, the program proceeds to block 156 and performs any necessary processing of the data received by the user terminal 22 such as generating another screen with additional menu options or simply displaying the current screen while waiting for another user input. Processing in block 156 can also involve data storage operations, data manipulation or reformatting, data analysis and report generation via the display or printer, partitioning or sectioning of an image, merging of the image with other image or non-image data, among other types of processing. If the information transmitted by the system gateway 23 includes audio signals, these signals are provided at the speaker 104 in lieu of a prior audio program. For example, a radio broadcast can be provided via the speaker 104 which is intermittently interpreted by an audio signal received from the system gateway 23.

Once the desired data operation is carried out in block 150, the program proceeds to block 158 to determine whether the user has requested another data transmission operation via the LEO satellite. For example, the user can depress a keyboard button on operate a mouse to select another menu option. The computer 86 in turn interprets the user's action and generates a command for transmission to the system gateway 23 via the LEO satellite 24. The system gateway 23 appropriates, frames and formats the command for transmission to the Internet. Files retrieved from the Internet in response to the menu selection or command are subsequently uplinked to the user terminal 22 via satellite 20 (blocks 148 and 150). The process described in connection with blocks 146, 148, 150, 152, 154, 156 and 158 continues repeatedly for the duration of the Internet session. After the user terminal 22 operates on the most recent retrieved file, and no more Internet access is desired, as indicated by the negative branch of decision block 158, Internet access session can be terminated. The user can be billed for the Internet access time and downloaded data using a monthly statement generated by the Internet service provider.

The computer 29 can be provided with Web browser software, for example, for communicating with the Internet service provider (e.g., the system gateway 23). Alternatively, the system gateway 23 can download screens to the user terminals 22. In accordance with another embodiment of the present invention, the system gateway 23 can be configured as a value-added Internet/WWW gateway which provides user terminals with interactive interfaces. The system 10 can therefore minimize the amount of backhaul data transmitted from the user terminals 22 via the LEO satellites 24. For example, menus can be provided to the user terminals via a satellite 20 download operation which limit menu options to only a few selections. Backhaul data that is typically in the range of 32 bytes can be reduced to being on the order of 4 bits. Thus, channel capacity demand and the cost of the backhaul link is reduced.

In accordance with another embodiment of the present invention, spread spectrum or another form of coding is used on data that is transmitted on a 7 Gigahertz uplink in the satellite direct radio broadcast system. Thus, a mobile/portable uplink is available for small amounts of data instead of or as a supplement to the LEO satellite uplink.

For illustrative purposes, the system gateway 23 has heretofore been described as belonging to a commercial Internet service provider which sells subscriptions to users and then bills users for accessing the Internet/WWW via the gateway on a monthly basis. The Internet service provider, however, need not be a nationwide TCP/IP network. The global, portable Internet access system 10 of the present invention can accommodate different modes for providing Internet access to the user terminals 22 such as access through a university computer center or a large corporate network. Thus, a plurality of gateway routers from different types of networks can be used to provide user terminals with Internet access. In addition, different subscription arrangements (e.g., charging users on a transactional basis) fall within the scope of the present invention. Users can also select from a number of different types and fully scaleable Internet services ranging from simple dial-up access to dedicated data line access. Broadcast programs comprising Internet information can include, but are not limited to, WWW information, electronic mail, news broadcasts originating from the Internet, telnet service and file transfer protocol or FTP-type files.

Although the present invention has been described with reference to a preferred embodiment thereof, it will be understood that the invention is not limited to the details thereof. Various substitutions and modifications have been suggested in the foregoing description, and others will occur to those of ordinary skill in the art. All such substitutions and modifications are intended to be embraced within the scope of the invention as defined in the appended claims.

What is claimed is:

1. A system for providing portable computer network access comprising:
    a satellite direct radio broadcast system having a first satellite and a broadcast station for transmitting broadcast programs to said first satellite;
    a user terminal comprising a direct radio broadcast receiver for receiving said broadcast programs transmitted from said first satellite;
    a gateway for providing computer network service; and
    a communication link between said user terminal and said gateway, said user terminal being operable to generate backhaul signals comprising computer network access requests and responses of a user and to transmit said backhaul signals to said gateway via said communication link, said broadcast station being operable to transmit data provided by said gateway in response to said backhaul signals via said first satellite.

2. A system as claimed in claim 1, wherein said communication link comprises a second satellite and said user terminal comprises a transceiver for transmitting said backhaul signals to said second satellite.

3. A system as claimed in claim 2 and comprising a plurality of user terminals, said broadcast station being operable to transmit a control word with said data from said gateway to said first satellite, said control word corresponding to a selected one of said plurality of user terminals, each of said plurality of user terminals being operable to receive said data via said receiver but not use said data unless said control word corresponds to said user terminal.

4. A system as claimed in claim 1, wherein said communication link comprises at least one low earth orbit satellite and said user terminal comprises a transceiver configured for transmitting said backhaul signals to said at least one low earth orbit satellite.

5. A system as claimed in claim 1, wherein said user terminal is portable.

6. A system as claimed in claim 1 and comprising a plurality of user terminals, said broadcast station being operable to provide a control word with said data from said gateway in said broadcast programs for transmission to said first satellite, said control word corresponding to a selected one of said plurality of user terminals, each of said plurality of user terminals being operable to receive said data via said receiver but not to use said data unless said control word corresponds to said user terminal.

7. A system as claimed in claim 1, wherein said communication link is a second satellite link.

8. A system as claimed in claim 1 and comprising a plurality of user terminals, said broadcast station being operable to transmit a control word with said data from said gateway to said first satellite, said control word corresponding to a selected one of said plurality of user terminals, each of said plurality of user terminals being operable to receive said data via said receiver but not use said data unless said control word corresponds to said user terminal.

9. A system as claimed in claim 1, wherein said user terminal comprises a processing device, a display device, a speaker and a user input device, said processing device being programmable to play audio signals provided in one of said broadcast programs to said speaker while processing said data received in one of said broadcast programs and generating at least one screen on said display device to provide said user with options for using the computer network, said options being selectable using said user input device.

10. A satellite direct broadcast system for providing portable computer network access comprising:
    at least one satellite for transmitting signals comprising broadcast programs to a plurality of user terminals, said plurality of user terminals each comprising a receiver for receiving said signals transmitted by said satellite;
    at least one broadcast station for transmitting broadcast programs to said satellite;
    at least one gateway for providing computer network service, said at least one gateway being configured to provide computer network data to said satellite for transmission to said plurality of user terminals; and
    a communication link between said at least one gateway and each of said plurality of user terminals, each of said plurality of user terminals being configured to transmit output signals to said gateway via said communication link to perform at least one of a plurality of functions selected from the group consisting of initiating an computer network session, requesting a web page, browsing, requesting downloading of selected said computer network data, transmitting a user input in response to a screen prompt generated by said user terminal and terminating an computer network session.

11. A satellite direct radio broadcast system as claimed in claim 10, wherein said communication link comprises a low earth orbit satellite and said user terminal comprises a low earth orbit satellite transceiver for transmitting said output signals to said gateway.

12. A satellite direct radio broadcast system as claimed in claim 10, wherein said communication link comprises a satellite, and said user terminal comprises a communication interface to said communication link for transmitting said output signals to said gateway.

13. A user terminal for receiving satellite direct radio broadcasts comprising:
    a receiver for receiving direct radio broadcasts from a first satellite;

a communication device for communicating with a digital communication network;

a display device;

an input device; and a processor connected to said receiver, said communication device, said display device and said input device, said processor being programmable to initiate access to a digital communication network by generating and transmitting an outgoing signal thereto via said communication device, said digital communications network being configured to download data therefrom to said user terminal via said first satellite, said processor being programmable to generate and transmit another said outgoing signal via said communications device to communicate with said digital communication network in response to user inputs via said input device and to receive incoming signals generated by said digital communication network in response to said user inputs via said receiver.

14. A user terminal as claimed in claim 13, wherein said digital communication network comprises a second satellite and said communication device comprises a transceiver for transmitting said outgoing signal to said second satellite.

15. A user terminal as claimed in claim 13, wherein said digital communication network comprises a radio frequency network and said user terminal comprises a transceiver configured for transmitting said output signals and said user inputs to said radio frequency network, said gateway being operable to transmit said data to said first satellite in response to said output signals to provide global computer network access.

16. A user terminal as claimed in claim 15, wherein a control word is transmitted with said data from said gateway to said first satellite and said user terminal is one of a plurality of user terminals, said control word corresponding to a selected one of said plurality of user terminals, each of said plurality of user terminals being operable to receive said data via said receiver but not use said data unless said control word corresponds to said user terminal.

17. A method of providing portable user terminals with global computer network access comprising the steps of:

generating a request to access the computer network from one of said user terminals;

transmitting said request from said user terminal via a communication link to a gateway for providing access to the computer network;

generating a broadcast program using data provided by said gateway;

transmitting said broadcast program to all of said user terminals using a satellite in a direct radio broadcast system;

receiving said broadcast program at each of said user terminals comprising a satellite direct radio broadcast receiver;

generating a backhaul signal using at least one of said user terminals; and transmitting said backhaul signal from said user terminal to said gateway via said communication link.

18. A method as claimed in claim 17, wherein said step of generating a broadcast program further comprises the step of providing a control word in said broadcast program for addressing a selected one of said user terminals.

19. A method as claimed in claim 18, wherein said receiving step comprises the step of each of said user terminals receiving said data via said direct radio broadcast receiver but not using said data unless said control word corresponds to said user terminal.

20. A method as claimed in claim 17, wherein said backhaul signal is selected from the group consisting of initiating an computer network session, requesting a web page, browsing, requesting downloading of selected said computer network data, transmitting a user input in response to a screen prompt generated by said user terminal and terminating an computer network session.

* * * * *